United States Patent
Huang et al.

(10) Patent No.: US 10,187,785 B2
(45) Date of Patent: Jan. 22, 2019

(54) METHOD AND SYSTEM FOR CONTROLLING ACCESS OF CSG IN DUAL-CONNECTION ARCHITECTURE

(71) Applicant: ZTE CORPORATION, Shenzhen, Guangdong Province (CN)

(72) Inventors: Ying Huang, Shenzhen (CN); Yin Gao, Shenzhen (CN); Feng Xie, Shenzhen (CN); Lifeng Han, Shenzhen (CN); Shuang Liang, Shenzhen (CN)

(73) Assignee: XI'AN ZHONGXING NEW SOFTWARE CO., LTD, Xi'an (CN)

( * ) Notice: Subject to any disclaimer, the term of this patent is extended or adjusted under 35 U.S.C. 154(b) by 0 days.

(21) Appl. No.: 15/304,442

(22) PCT Filed: Jul. 29, 2014

(86) PCT No.: PCT/CN2014/083248
§ 371 (c)(1),
(2) Date: Oct. 14, 2016

(87) PCT Pub. No.: WO2015/158060
PCT Pub. Date: Oct. 22, 2015

(65) Prior Publication Data
US 2017/0048692 A1 Feb. 16, 2017

(30) Foreign Application Priority Data
Apr. 14, 2014 (CN) .......................... 2014 1 0148172

(51) Int. Cl.
*H04W 8/20* (2009.01)
*H04W 76/15* (2018.01)
(Continued)

(52) U.S. Cl.
CPC ............. *H04W 8/20* (2013.01); *H04W 16/32* (2013.01); *H04W 36/08* (2013.01); *H04W 48/20* (2013.01);
(Continued)

(58) Field of Classification Search
CPC ..... H04W 8/20; H04W 16/32; H04W 76/025; H04W 48/20; H04W 36/08; H04W 84/042; H04W 84/045
See application file for complete search history.

(56) References Cited

U.S. PATENT DOCUMENTS 9,749,841 B2 * 8/2017 Huang ................... H04W 8/186
9,801,102 B2 * 10/2017 Xu ..................... H04W 36/0033
(Continued)

FOREIGN PATENT DOCUMENTS

| WO | 2011023099 | | 3/2011 |
|---|---|---|---|
| WO | 2015144253 | A1 | 10/2015 |

OTHER PUBLICATIONS

International Search Report and Written Opinion dated Jan. 21, 2015, for International Application No. PCT/CN2014/083248.
(Continued)

*Primary Examiner* — Brandon J Miller
(74) *Attorney, Agent, or Firm* — Plumsea Law Group, LLC

(57) ABSTRACT

The present document discloses a method and a system for controlling access of a Closed Subscriber Group (CSG) in a dual-connection architecture. The method includes: a base station acquiring CSG identity state information of a user equipment (UE); and the base station determining a CSG access policy of the UE according to the acquired CSG identity state information of the UE.

32 Claims, 6 Drawing Sheets

(51) Int. Cl.
*H04W 16/32* (2009.01)
*H04W 48/20* (2009.01)
*H04W 36/08* (2009.01)
*H04W 84/04* (2009.01)

(52) U.S. Cl.
CPC .......... *H04W 76/15* (2018.02); *H04W 84/042* (2013.01); *H04W 84/045* (2013.01)

(56) References Cited

U.S. PATENT DOCUMENTS

| | | | | |
|---|---|---|---|---|
| 2010/0238858 A1* | 9/2010 | Kim | ............... | H04W 4/08 370/328 |
| 2011/0165778 A1* | 7/2011 | Choi | ............... | G03F 1/78 438/694 |
| 2011/0286433 A1* | 11/2011 | Xiao | ............... | H04L 5/0007 370/331 |
| 2012/0058792 A1* | 3/2012 | Liang | ............... | H04W 48/06 455/509 |
| 2012/0100860 A1* | 4/2012 | Lei | ............... | H04W 36/20 455/438 |
| 2012/0157077 A1* | 6/2012 | Lee | ............... | H04W 48/04 455/419 |
| 2012/0263147 A1* | 10/2012 | Takahashi | ............. | H04W 36/08 370/331 |
| 2013/0079021 A1 | 3/2013 | Centonza | | |
| 2014/0011519 A1* | 1/2014 | Lee | ............... | H04W 8/24 455/456.1 |

OTHER PUBLICATIONS

European Search Report dated Feb. 22, 2017 for EP Application No. 14889608.7.
QUALCOMM Incorporated et al: "Analysis of SA2 impacts related to the study on Small Cell Enhancements in RAN2", 3rd Generation Partnership Project (3GPP); France, vol. SA WG2, No. Taipei, Taiwan, Jan. 19, 2014.

* cited by examiner

METHOD AND SYSTEM FOR CONTROLLING ACCESS OF CSG IN DUAL-CONNECTION ARCHITECTURE

CROSS-REFERENCE TO RELATED APPLICATION(S)

This application is the U.S. National Phase application of PCT application number PCT/CN2014/083248 having a PCT filing date of Jul. 29, 2014, and which claims the priority of Chinese patent application 201410148172.3 filed on Apr. 14, 2014, the disclosures of which are hereby incorporated by reference.

TECHNICAL FIELD

The present document relates to the technical field of radio communication, in particular to a method and a system for controlling access of a CSG in a dual-connection architecture.

BACKGROUND OF RELATED ART

With the development of wireless multimedia service, the demands of people for high data rate and good user experience are gradually increasing, and thus higher requirements are made on system capacity and coverage of the traditional cellular network. In the traditional Long Term Evolution (LTE) cellular network, a macro base station is used as a unique access side network element to provide an access service for User Equipment (UE). In order to satisfy the demands of users for higher data rate and improve the spectral efficiency of the cellular network, 3rd Generation Partnership Project (3GPP) introduces a Low Power Node (LPN) as a supplement to the macro base station to provide the access service for the UE. LPN has the features of low cost, low power consumption, easy deployment and the like. Usually, there are two deployment scenarios, i.e., hot-spot deployment and enhanced coverage, the data rate of high-rate data services in indoor and outdoor hot-spot areas can be effectively improved, and the coverage of the remote area or cell edge is improved. Usually, LPN may also be called a small base station, such as a Home eNB (HeNB), a picocell (pico), a Remote Radio Unit/Remote Radio Head (RRU/RRH), a Relay Node (RN) or the like. Under the hot-spot deployment scenario, in order to get higher data rate and spectral efficiency, a great number of small base stations need to be densely deployed in an area. However, since the coverage range of small cells under the small base stations is relatively small, the probability of handover failure increases when a UE moving at medium and high speed passes through the small base stations, and consequently the UE service continuity is influenced. In order to improve the UE mobility performance after the small cells are introduced, the industry puts forward a method for providing higher data rate and satisfying user electricity saving demands by the way that a certain base station (such as a macro base station) guarantees the fundamental coverage, the UE always keeps a Radio Resource Control (RRC) connection with the certain base station and the small cell is only used as a Transmission Point (TP). In this system architecture, the UE keeps the connections with at least two base stations and uses the radio resources under the two base stations, such that cross-node radio resource aggregation can be realized. This architecture is usually called a dual-connection architecture, as illustrated in FIG. 1. In the two base stations connected with the UE, one base station which has a certain management and control capability is usually called a Master eNB (MeNB) and the other base station is called a Secondary eNB (SeNB). After the UE accesses the MeNB, the dual connection may be realized through an SeNB adding process. After the SeNB is successfully added, a series of management such as SeNB modification, SeNB deletion and SeNB change and the like may be performed on the SeNB, herein SeNB modification refers to modifying parameters when the UE accesses the SeNB, and SeNB change refers to deleting the SeNB and adding a new SeNB.

In the dual-connection architecture, a user plane has three possible architectures. As illustrated in FIG. 2, in architecture option 1, an S1-U interface between a base station and a Serving Gateway (SGW) is terminated at an MeNB and an SeNB; in architecture option 2, the S1-U interface is terminated at the MeNB, and at a Radio Access Network (RAN) side there is no bearer separation; and in architecture option 3, the S1-U interface is terminated at the MeNB, and at the RAN side there is bearer separation, e.g., after downlink data in Evolved Packet System (EPS) bearers arrive at the MeNB, a part of data in one bearer may be separated to the SeNB and then are transmitted to the UE by the SeNB. According to the user plane protocol stack architecture of the SeNB, the above-mentioned three architectures may be further divided. At present, the dual connection may adopt architecture 1A in architecture option 1 or architecture 3C in architecture option 3. Architecture 1A as illustrated in FIG. 3 adopts architecture option 1, and the user plane protocol stack on the SeNB has an independent Packet Data Convergence Protocol (PDCP) layer and protocol layers below, and there is no bearer separation. Architecture 3C as illustrated in FIG. 4 adopts architecture option 3, and the user plane protocol stack on the SeNB has an independent Radio Link Control (RLC) protocol layer and protocol layers below.

In another aspect, in the dual-connection architecture, an HeNB is possibly used as an MeNB or SeNB. Due to the requirement that the HeNB only provides services for specific users, a concept of Closed Subscriber Group (CSG) is introduced, and each CSG has a unique identifier, i.e., CSG ID. In LTE, cells of three different access modes are defined for the HeNB, i.e., CSG cell (which corresponds to a closed mode HeNB and can be accessed by a UE which is registered as a member of the CSG), hybrid cell (which corresponds to a hybrid mode HeNB and can be accessed by any terminal, but the UE which is registered as the member of the CSG can access with an identity of higher-priority member), open cell (which corresponds to an open mode HeNB and can be accessed by any UE). The access mode and the CSG ID of the HeNB can be known through air interface broadcasting. If the HeNB does not broadcast the CSG ID and the CSG indication, the cell is an open cell; if the HeNB broadcasts the CSG ID and the CSG indication with a value of "true", the cell is a CSG cell; and if the HeNB broadcasts the CSG ID and the CSG indication with a value of "false", the cell is a hybrid cell. A core network element and a UE respectively store CSG subscription information, including a CSG ID list that the users can access with identities of members. Under the scenario of HeNB existing in the dual-connection architecture, CSG related functions need to be supported, for example, access control based on CSG member identities. For a closed cell, a UE with member identity can only be allowed to access, and for a hybrid cell, whether the UE is a member or a non-member needs to be determined and the base station needs to perform corresponding admission control or rate control aiming at different member identities. However, there is no CSG access control method aiming at the scenario of HeNB existing in the dual-connection architecture in the existing art.

SUMMARY

In order to solve the technical problem existing at present, the embodiments of the present document provide a method and a system for controlling access of a CSG in a dual-connection architecture.

The embodiment of the present document provides a method for controlling access of a CSG in a dual-connection architecture, the method includes:

a base station acquiring CSG identity state information of a UE; and the base station determining a CSG access policy of the UE according to the acquired CSG identity state information of the UE.

The embodiment of the present document provides a system for controlling access of a CSG in a dual-connection architecture, the system includes:

a communication module configured to acquire CSG identity state information of a UE; and a control module configured to determine a CSG access policy of the UE according to the acquired CSG identity state information of the UE.

The embodiment of the present document further provides a computer-readable storage medium, the storage medium includes a group of computer-executable instructions which are used for implementing the method for controlling access of a CSG in a dual-connection architecture described in the embodiment of the present document.

The method and the system for controlling access of a CSG in a dual-connection architecture provided by the embodiments of the present document can guarantee that CSG access control or member identity verification functions can be correctly implemented under a situation that an HeNB is used in the dual-connection architecture, such that the UE in the dual-connection architecture can access the HeNB with a correct CSG identity.

SPECIFIED EMBODIMENTS OF THE INVENTION

The technical solution of the present document will be further described below in detail in combination with the drawings and the specific embodiments.

Figure 1:
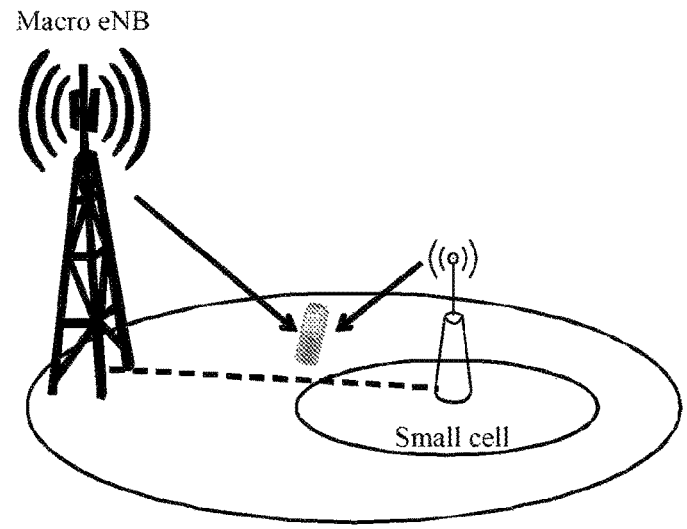
FIG. 1 illustrates a schematic diagram of a dual-connection architecture in the related art.
Figure 2:
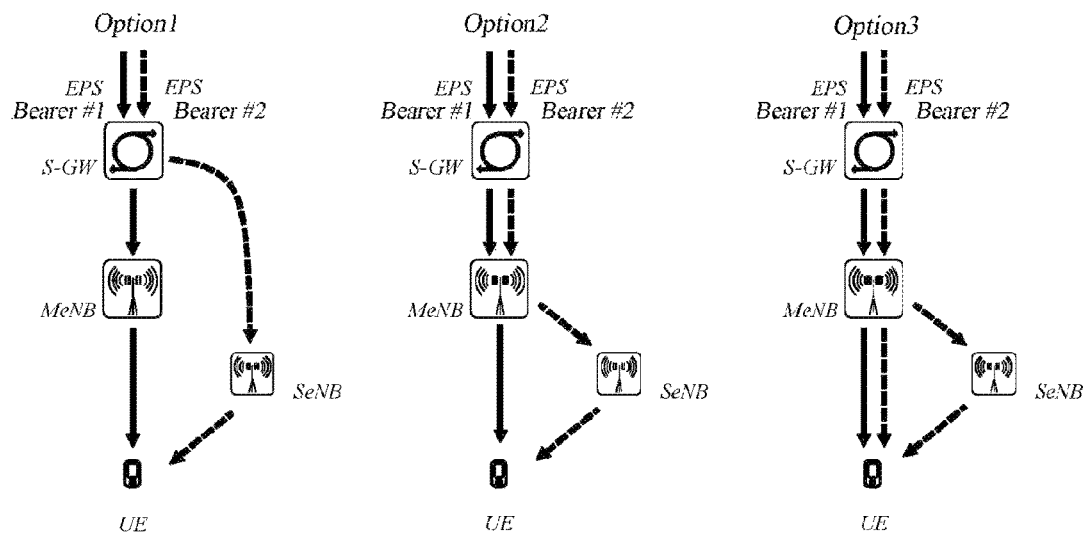
FIG. 2 illustrates a schematic diagram of a dual-connection user plane architecture in the related art.
Figure 3:
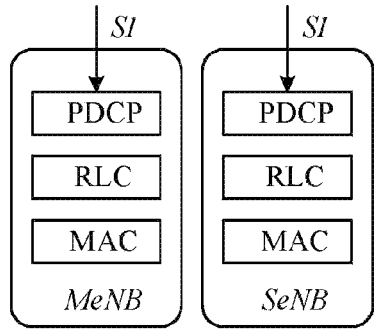
FIG. 3 illustrates a schematic diagram of dual-connection user plane architecture 1A in the related art.
Figure 4:
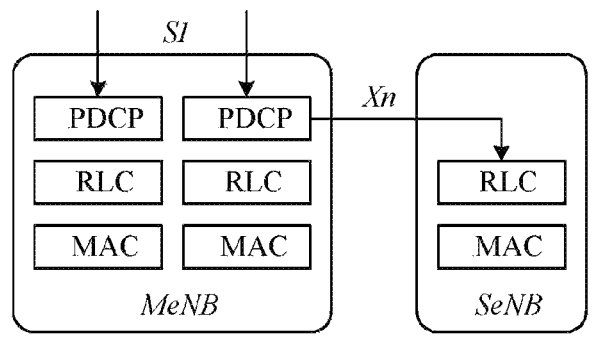
FIG. 4 illustrates a schematic diagram of dual-connection user plane architecture 3C in the related art.
Figure 5:
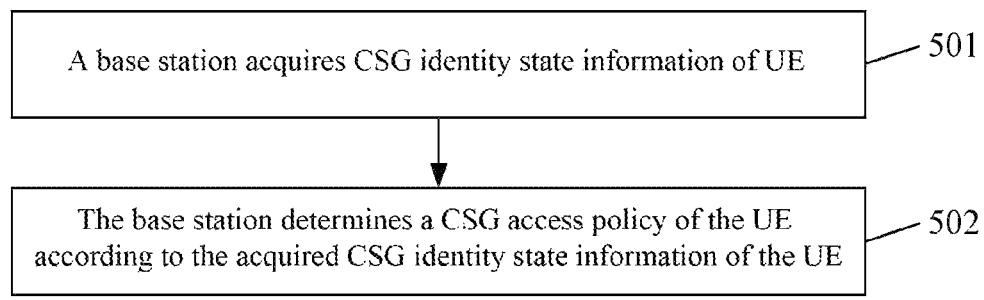
FIG. 5 illustrates a flowchart of a method for controlling access of a CSG in a dual-connection architecture provided by the embodiment of the present document.

The embodiment of the present document provides a method for controlling access of a CSG in a dual-connection architecture. As illustrated in FIG. 5, the method mainly includes:

In step 501, a base station acquires CSG identity state information of a UE.

In step 502, the base station determines a CSG access policy of the UE according to the acquired CSG identity state information of the UE.

Herein, the base station acquiring the CSG identity state information of the UE includes:

the base station acquires the CSG identity state information of the UE from a Mobile Management Entity (MME);

and/or the base station acquires the CSG identity state information from the UE;

and/or the base station self-determines the CSG identity state information of the UE.

The base station acquiring the CSG identity state information of the UE from the MME includes:

the base station receives the CSG identity state information of the UE transmitted by the MME through an S1 interface message, and herein the S1 interface message is:

an Evolved-Universal Terrestrial Radio Access Network (E-UTRAN) Radio Access Bearer (E-RAB) modification acknowledgment message;

or a path transfer request acknowledgment message;

or a newly-added S1 message.

Herein, the base station is an MeNB or an SeNB.

The base station determining the CSG access policy of the UE according to the acquired CSG identity state information of the UE includes:

the MeNB determines whether the UE can access the SeNB according to the CSG identity state information;

or the MeNB determines whether the UE accesses the SeNB with an identity of a member or a non-member according to the CSG identity state information;

or the SeNB determines whether the UE can access the SeNB according to the CSG identity state information;

or the SeNB determines whether the UE accesses the SeNB with an identity of a member or a non-member according to the CSG identity state information.

Preferably, after the MeNB determines that the UE can access the SeNB or the UE accesses the SeNB with an identity of a member or a non-member according to the CSG identity state information, the method further includes: the MeNB transmits the CSG identity state information to the SeNB;

or, after the SeNB determines that the UE can access the SeNB or the UE accesses the SeNB with an identity of a member or a non-member according to the CSG identity state information, the method further includes:

the SeNB transmits the CSG identity state information to the MeNB.

Preferably, the MeNB or SeNB determining whether the UE can access the SeNB according to the CSG identity state information further includes:

if determining that the UE can access the SeNB, the MeNB initiates an adding process of the SeNB;

or if determining that the UE cannot access the SeNB, the MeNB does not initiate the adding process of the SeNB;

or if determining that the UE cannot access the SeNB, the SeNB refuses an SeNB adding request transmitted by the MeNB.

A message for the SeNB refusing the adding request contains a cause value indicating that the SeNB refuses to be added or the CSG identity state information of the UE.

Preferably, the MeNB transmits CSG related information to the SeNB in the adding process of the SeNB.

Preferably, the MeNB transmitting the CSG related information to the SeNB in the adding process of the SeNB includes:

the MeNB transmits the CSG related information to the SeNB through an SeNB adding request message of an X2 interface; and the CSG related information includes at least one of the following: a CSG identity state, a CSG identifier and an access mode.

Before the base station acquiring the CSG identity state information of the UE, the method further includes:

the base station transmits an S1 message to the MME to request the MME to transmit the CSG identity state information of the UE.

The method further includes:

the MeNB requests the MME to transmit the CSG identity state information of the UE before the SeNB is added;

or the MeNB requests the MME to transmit the CSG identity state information of the UE after the SeNB is added;

or the SeNB requests the MME to transmit the CSG identity state information of the UE after receiving the SeNB adding request transmitted by the MeNB;

or the SeNB requests the MME to transmit the CSG identity state information of the UE after the SeNB is added.

The S1 message is:

an E-RAB modification indication message;

or a path transfer request message;

or a newly-added S1 message.

The S1 message includes at least one of the following: a CSG identifier, an access mode, a Public Land Mobile Network (PLMN) identifier, a CSG identity state, an identifier of a base station corresponding to the CSG identifier, E-RAB information and MeNB or SeNB indication information.

The PLMN identifier is a current serving PLMN identifier of the UE or a PLMN identifier selected by the UE under the SeNB.

The MeNB or SeNB indication information indicates that the base station corresponding to the CSG identifier is an MeNB or an SeNB.

The method further includes: the base station transmits the CSG identifier and associated information of a bearer of the UE to the MME, and herein the CSG identifier and the associated information of the bearer of the UE include a CSG identifier and corresponding bearer information of the UE accessing through a cell where the CSG is located.

Before the base station acquiring the CSG identity state information of the UE, the method may further include:

the MME determines the CSG identity state information of the UE according to CSG subscription information of the UE;

and/or the MME verifies validity of the CSG identifier and/or the access mode in the S1 message.

The CSG identity state information includes:

a CSG identity state, herein the CSG identity state is a member or a non-member;

and/or access allowance or disallowance indication information;

and/or compliance or incompliance indication information, herein the compliance or incompliance indication information indicates that the CSG identity state of the UE verified by the MME is compliant or incompliant with the CSG identity state received by the MME in the request message transmitted by the base station;

and/or a CSG identifier.

The CSG identity state is a default CSG identity state, or a CSG identity state reported by the UE through an air interface, or a CSG identity state which is the same as the CSG identity state of the UE accessing the MeNB, or a CSG identity state transmitted by the MME and received by the base station.

Herein, the MeNB and/or the SeNB is an HeNB.

The following method embodiments are applicable to both dual-connection user plane architecture 1A and 3C. If the MeNB or the SeNB is an open mode HeNB, it can be considered as a macro eNB. The HeNB with the identity of the MeNB or the SeNB may be connected with the MME through an HeNB GW, and the S1 message interacted between the MME and the MeNB/SeNB is forwarded through the HeNB GW. The HeNB with the identity of the MeNB or the SeNB may be connected with another base station through an X2 GW, and the X2 message interacted between the MeNB/SeNB and the other base station and the X2 message interacted between the MeNB and the SeNB may be forwarded through the X2 GW. The embodiments of the technical solution will be further described below in detail in combination with the drawings.

Embodiment 1

Figure 6:
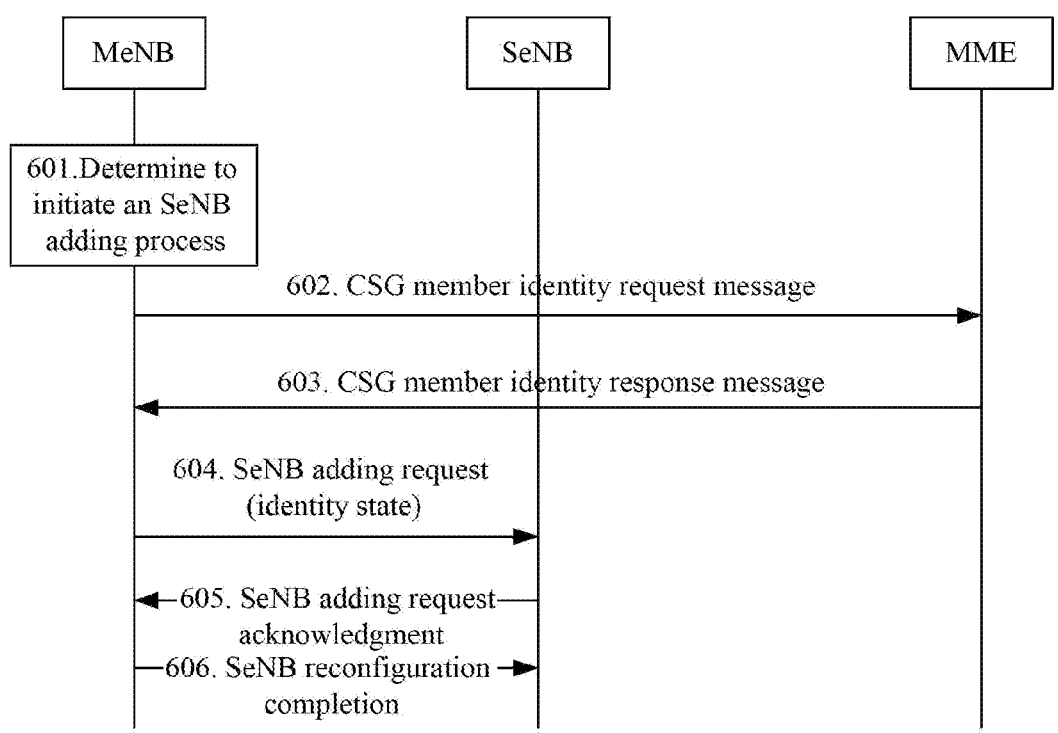
FIG. 6 illustrates a flowchart of embodiment 1 of the present document.

This embodiment describes a method for initiating CSG access control or identity verification by an MeNB before an SeNB is added. FIG. 6 is a flowchart of the method provided by this embodiment. As illustrated in FIG. 6, the method provided by this embodiment includes the following steps:

In step 601, an MeNB determines to initiate an SeNB adding process for UE based on a Radio Resource Management (RRM) measurement report of the UE. In this embodiment, the SeNB is an HeNB, and the RRM measurement report of the UE contains a CSG identity state of the UE in a CSG/hybrid cell of the SeNB, or reports a PLMN ID list indicating that the UE has a member identity in the CSG/hybrid cell of the SeNB. The measurement report of the UE contains PCI/ECGI of the SeNB, the MeNB may know an access mode of the SeNB according to the PCI/ECGI, and the measurement report of the UE further contains CSG ID of a cell under the SeNB. Deployment of the MeNB and the SeNB may be divided into the following several situations:

1) the MeNB is a macro eNB and the SeNB is a hybrid or closed mode HeNB;

2) both the MeNB and the SeNB are hybrid or closed mode HeNBs, and CSG IDs of the MeNB and the SeNB are different; and 3) both the MeNB and the SeNB are hybrid or closed mode HeNBs, and CSG IDs of the MeNB and the SeNB are the same.

Under the situation 1) or 2), the MME needs to perform CSG access control or member identity verification; and under the situation 3), the MeNB directly initiates the SeNB adding process and the MME does not need to perform the CSG access control or member identity verification, but the UE accesses the SeNB with the same CSG identity state of the UE in the CSG/hybrid cell of the MeNB, i.e., subsequent steps 602 and 603 are skipped.

In step 602, if the MME needs to perform the CSG access control or member identity verification, the MeNB needs to acquire the CSG identity state of the UE in the CSG/hybrid cell of the SeNB from the MME to determine whether the UE can access the SeNB or whether the UE accesses the SeNB with an identity of a member or a non-member. The MeNB transmits an S1 message to request the MME to perform the CSG access control or member identity verification, and the S1 message may be a newly-added S1 interface message such as a CSG member identity request message. The request message may contain a CSG ID, an access mode, a PLMN identifier, a CSG identity state and a base station identifier corresponding to the CSG ID. Herein, the CSG identity state may be a CSG identity state reported by the UE, the CSG ID is a CSG identifier of the CSG/hybrid cell of the SeNB, and the access mode is the access mode of the SeNB cell, and may be hybrid or closed, or is indicated by the CSG or is a closed mode by default under the situation that the access mode is not included. The base station identifier corresponding to the CSG ID is the eNB ID of the SeNB. In addition, the request message may contain E-RAB information of the UE which is to be transferred to the SeNB, such as one or more E-RAB IDs.

In step 603, the MME judges whether the UE can access the CSG/hybrid cell of the SeNB or whether the member identity of the UE is a member or a non-member according to the CSG subscription information of the UE acquired from the HSS (e.g., acquired from the CSG member identity response message of the HSS). Alternatively, the MME further performs the verification of the CSG ID and/or access mode to verify the validity of the CSG ID and/or access mode of the CSG/hybrid cell of the SeNB. If the request message received by the MME contains the E-RAB information, the MME may use the CSG ID and the corresponding E-RAB information for a purpose of subsequently charging. The MME transmits the verified CSG identity state information of the UE to the MeNB through the S1 message. The CSG identity state information includes a CSG identity state which is a member or a non-member, or access allowance or disallowance indication information, or compliance or incompliance indication information, herein the compliance or incompliance indication information indicates that the CSG identity state of the UE verified by the MME is compliant or incompliant with the identity state in the received request message.

In step 604, the MeNB determines whether to add an SeNB for the UE according to the received CSG identity state information. If the mode of the SeNB cell is a closed mode and the CSG identity state information indicates that the UE is a member in the CSG cell of the SeNB or contains access allowance indication information, the SeNB may be added; and if the CSG identity state information indicates that the UE is a non-member in the CSG cell of the SeNB or contains access disallowance indication information, the SeNB is not added. If the mode of the SeNB cell is a hybrid mode and the CSG identity state information indicates that the UE is a member or a non-member in the hybrid cell of the SeNB, correspondingly the UE accesses the SeNB with an identity of a member or a non-member. If the MeNB determines to perform the adding of the SeNB, an SeNB adding request message is transmitted to the SeNB and the message at least contains the CSG identity state of the UE in the SeNB cell.

In step 605, the SeNB determines whether to accept the SeNB adding request, e.g., according to the current load situation. If the SeNB adding request is accepted, a resource reservation is made according to the E-RAB information in the adding request and an SeNB adding request acknowledgment message is transmitted to the MeNB, and the message may contain air interface radio resource configuration information.

In step 606, if air interface configuration information change of the UE is involved, the MeNB transmits an RRC connection reconfiguration message to the UE to instruct the UE to perform air interface reconfiguration. After the UE completes the air interface reconfiguration, an RRC reconfiguration completion message is replied to the MeNB. Then, the MeNB transmits an SeNB reconfiguration completion message to the SeNB to indicate that new radio air interface configuration has been successfully completed.

If data forwarding is needed, a corresponding data forwarding process may be performed between the MeNB and the SeNB. If dual-connection user plane architecture A1 is adopted, the MeNB initiates a user plane path update process to the MME to update S1-U user plane paths of partial bearers on the SGW. Under the situation that the dual-connection user plane architecture 1A or 3C is adopted, if the request message received by the MME in step 602 does not contain E-RAB information, the MeNB may transmit the CSG ID of the SeNB and the corresponding E-RAB information of the UE to the MME through the S1 message for a purpose of subsequently charging after the SeNB is added, e.g., through an E-RAB modification indication message or path transfer request message in a user plane path update process.

Embodiment 2

Figure 7:
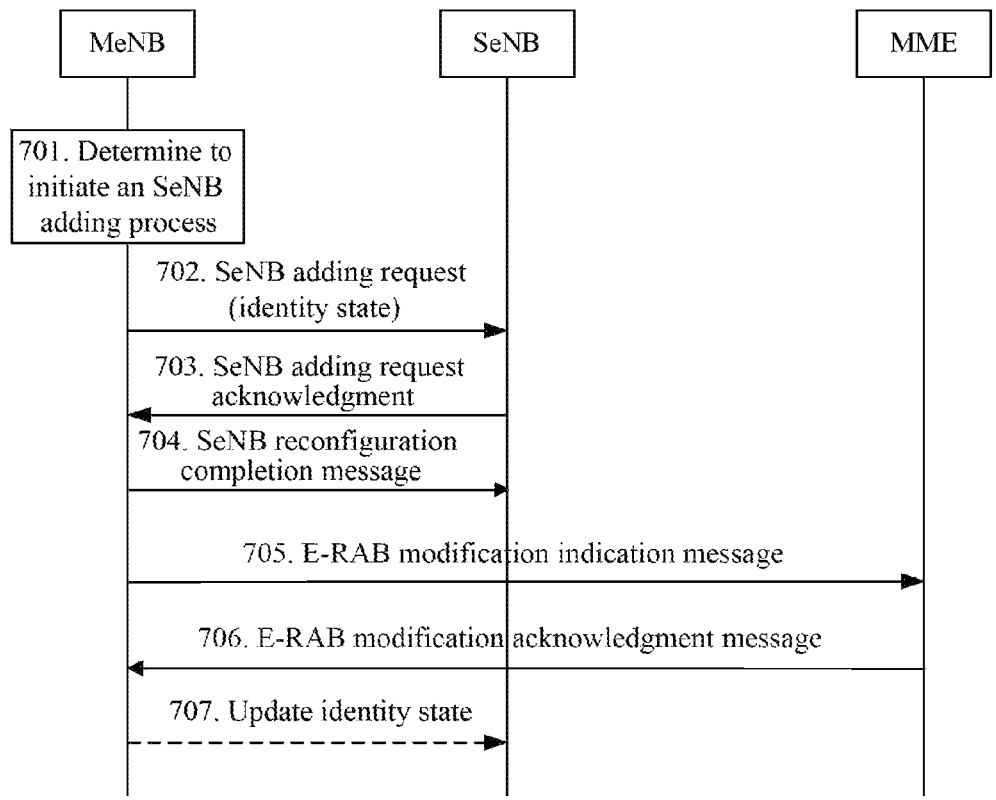
FIG. 7 illustrates a flowchart of embodiment 2 of the present document.

This embodiment describes a method for initiating CSG access control or identity verification by an MeNB after an SeNB is added. FIG. 7 is a flowchart of the method provided by this embodiment. As illustrated in FIG. 7, the method provided by this embodiment includes the following steps:

In step 701, an MeNB determines to initiate an SeNB adding process for a UE based on an RRM measurement report of the UE. In this embodiment, the SeNB is an HeNB, and the RRM measurement report of the UE contains a CSG identity state of the UE in a CSG/hybrid cell of the SeNB, or reports a PLMN ID list indicating that the UE has a member identity in the CSG/hybrid cell of the SeNB. The measurement report of the UE contains PCI/ECGI of the SeNB, the MeNB may know an access mode of the SeNB according to the PCI/ECGI, and the measurement report of the UE further contains CSG ID of a cell under the SeNB. If both the MeNB and the SeNB are hybrid or closed mode HeNBs and CSG IDs of the MeNB and the SeNB are the same, the MeNB directly initiates the SeNB adding process and the UE accesses the SeNB with the same CSG identity state of the UE in the CSG/hybrid cell of the MeNB. If the SeNB is a hybrid mode HeNB (except the situation that the MeNB is also an HeNB and has the same CSG ID as the SeNB), the MeNB determines that the UE can firstly access the SeNB with the default CSG identity state or the CSG identity state reported by the UE, and then a CSG member identity verification result is acquired from an MME.

In step 702, if the MeNB determines that the UE can access the SeNB, the MeNB transmits an SeNB adding request message to the SeNB, herein the SeNB adding request message at least contains a CSG identity state to indicate that the UE accesses the SeNB with an identity of a member or a non-member. The CSG identity state may be a default CSG identity state, or a CSG identity state which is the same as the CSG identity state of the UE in the CSG/hybrid cell of the MeNB, or a CSG identity state reported by the UE, herein the default CSG identity state is a non-member identity.

In step 703, the SeNB determines whether to accept the SeNB adding request, e.g., according to the current load situation. If the SeNB adding request is accepted, a resource reservation is made according to the E-RAB information in the adding request and an SeNB adding request acknowledgment message is transmitted to the MeNB, and the message may contain air interface radio resource configuration information.

In step 704, if air interface configuration information change of the UE is involved, the MeNB transmits an RRC connection reconfiguration message to the UE to instruct the UE to perform air interface reconfiguration. The UE performs cell synchronization and random access with the SeNB and performs air interface reconfiguration, and then an RRC reconfiguration completion message is replied to the MeNB. Then, the MeNB transmits an SeNB reconfiguration completion message to the SeNB to indicate that new radio air interface configuration has been successfully completed.

In step 705, if data forwarding is needed, a corresponding data forwarding process may be performed between the MeNB and the SeNB. The MeNB transmits an E-RAB modification indication message (other newly-added S1 messages may also be adopted) to the MME to request the MME to perform a CSG check, i.e., CSG access control or member identity verification, herein the message may include the following information: a CSG identifier, an access mode, a CSG identity state, a PLMN ID and base station identifier information of the SeNB. Herein, the CSG identity state is received by the SeNB in the message in step 702, i.e., the CSG identity state may be a default CSG identity state, or a CSG identity state reported by the UE or a CSG identity state which is the same as the CSG identity state of the UE in the MeNB. If the user plane architecture 1A is adopted, the message is used for user plane path update and contains the E-RAB information which is to be transferred to the SeNB.

In step 706, the MME judges whether the UE can access the CSG/hybrid cell of the SeNB or whether the member identity is a member or a non-member according to the CSG subscription information of the UE acquired from the HSS. Alternatively, the MME further performs the verification of the CSG ID and access mode to verify the validity of the CSG ID and/or access mode of the CSG/hybrid cell of the SeNB. In addition, after the MME receives the E-RAB modification indication message, the CSG ID and the corresponding E-RAB information contained in the message may be used for a purpose of subsequently charging. The MME performs subsequent interaction with the SGW and informs the SGW about S1-U tunnel information of the SeNB. Then, the MME transmits the verified CSG identity state information of the UE to the MeNB through an E-RAB modification acknowledgment message. The CSG identity state information includes a CSG identity state which is a member or a non-member; or access allowance or disallowance indication information; or compliance or incompliance indication information, herein the compliance or incompliance indication information indicates that the CSG identity state of the UE verified by the MME is compliant or incompliant with the identity state in the received request message.

In step 707, if the CSG identity state received by the MeNB from the MME is different from the identity state carried in the message in step 702, the CSG identity state of the UE in the SeNB is updated, and the CSG identity state received from the MME in step 706 is transmitted to the SeNB. Specifically, the CSG identity state may be transmitted through an SeNB modification request message. Alternatively, the message may further contain updated UE Aggregate Maximum Bit Rate (UE-AMBR) for the SeNB. After the SeNB receives the CSG identity state, the CSG identity state of the UE in the SeNB is correspondingly updated.

Embodiment 3

Figure 8:
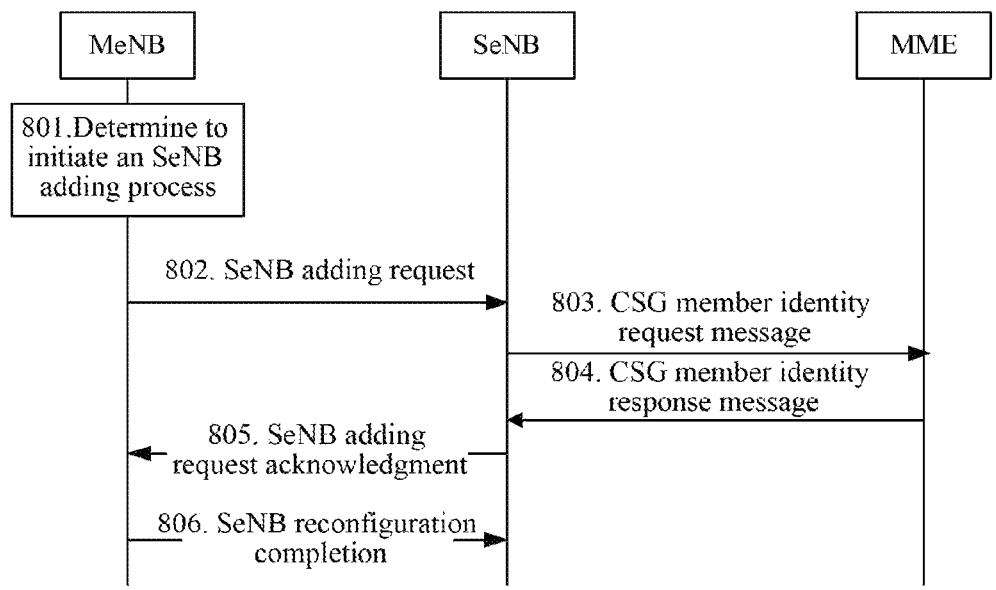
FIG. 8 illustrates a flowchart of embodiment 3 of the present document.

This embodiment describes a method for initiating CSG access control or identity verification by an SeNB in an SeNB adding process. FIG. 8 is a flowchart of the method provided by this embodiment. As illustrated in FIG. 8, the method provided by this embodiment includes the following steps:

In step 801, an MeNB determines to initiate an SeNB adding process for UE based on an RRM measurement report of the UE. In this embodiment, the SeNB is an HeNB, and the RRM measurement report of the UE contains a CSG identity state of the UE in a CSG/hybrid cell of the SeNB, or reports a PLMN ID list indicating that the UE has a member identity in the CSG/hybrid cell of the SeNB. The measurement report of the UE contains PCI/ECGI of the SeNB, the MeNB may know an access mode of the SeNB according to the PCI/ECGI, and the measurement report of the UE further contains CSG ID of a cell under the SeNB.

In step 802, the MeNB initiates the SeNB adding process for the UE and transmits an SeNB adding request message to the SeNB. Alternatively, the SeNB adding request message contains CSG identity state information. The CSG identity state information may be a CSG identity state reported by the UE, or a default CSG identity state, or an identity state which is the same as the identity state of the UE in the MeNB. For example, under the situation that both the MeNB and the SeNB are hybrid or closed mode HeNBs and CSG IDs of the MeNB and the SeNB are the same, the MME does not need to perform CSG access control or member identity verification, the UE accesses the SeNB with the same CSG identity state in the CSG/hybrid cell of the MeNB, and the CSG identity state contained in the SeNB adding request message is the same CSG identity state of the UE in the CSG/hybrid cell of the MeNB. Or, under the situation that the mode of SeNB is a hybrid mode (except the situation that the MeNB is also an HeNB and has the same CSG ID as the SeNB), the UE can access the SeNB with the default CSG identity state, herein the default CSG identity state is a non-member identity, and the CSG identity state contained in the SeNB adding request message is the same CSG identity state of the UE in the CSG/hybrid cell of the MeNB.

In step 803, the SeNB transmits an S1 message to the MME to request the MME to perform CSG access control and member identity verification to determine whether the UE can access the SeNB or whether the UE accesses the SeNB with an identity of a member or a non-member. The S1 message may be a newly-added S1 interface message such as a CSG member identity request message. The request message may contain a CSG ID, an access mode, a PLMN identifier and a CSG identity state. Herein, the CSG identity state may be a default identity state, or an identity state reported by the UE, or an identity state the same as the identity state of the UE accessing the MeNB. Alternatively, the request message may contain E-RAB information of the UE which is to be transferred to the SeNB, and E-RAB information of the UE is received from the MeNB, such as one or more E-RAB IDs.

In step 804, the MME judges whether the UE can access the CSG/hybrid cell of the SeNB or whether the member identity is member or non-member according to the CSG subscription information of the UE acquired from the HSS. Alternatively, the MME further performs the verification of the CSG ID and/or access mode to verify the validity of the CSG ID and/or access mode of the CSG/hybrid cell of the SeNB. In addition, the MME may use the CSG ID and the corresponding E-RAB information contained in the received request message for a purpose of subsequently charging. The MME transmits the verified CSG identity state information (which may be carried in a CSG member identity response message) of the UE to the SeNB. The CSG identity state information includes a CSG identity state which is a member or a non-member; or access allowance or disallowance indication information; or compliance or incompliance indication information, herein the compliance or incompliance indication information indicates that the CSG identity state of the UE verified by the MME is compliant or incompliant with the identity state in the received request message.

In step 805, the SeNB determines whether to accept the SeNB adding request according to the CSG identity state information received from the MME and/or the current load situation. If the SeNB adding request is accepted, a resource reservation is made according to the E-RAB information in the adding request and an SeNB adding request acknowledgment message is transmitted to the MeNB, and the message may contain air interface radio resource configuration information. The SeNB transmits the CSG identity state received from the MME in step 804 to the MeNB through the SeNB adding request acknowledgment message.

In step 806, after the MeNB receives the message, the MeNB instructs the UE to perform radio resource reconfiguration through RRC dedicated signaling and perform cell synchronization and random access with the SeNB. After the UE successfully completes the air interface reconfiguration, the MeNB transmits an SeNB adding reconfiguration completion message to the SeNB. Alternatively, the SeNB adding request acknowledgment message or the SeNB reconfiguration completion message may further contain updated UE-AMBR of the UE in the SeNB.

If user plane architecture 1A is adopted, the MeNB further needs to perform a user plane path update process, the MeNB transmits an E-RAB modification indication message or a path transfer request message to the MME, and the message contains E-RAB information which is to be transferred to the SeNB.

In addition, under the situation that user plane architecture 1A or 3C is adopted, if the message in step 803 does not contain the E-RAB information of the UE which is to be transferred to the SeNB, the MeNB or the SeNB may transmit the E-RAB information and the corresponding CSG ID to the MME through the S1 message, e.g., through the E-RAB modification indication message or the path transfer request message, herein the time for transmitting the message is not limited.

Embodiment 4

Figure 9:
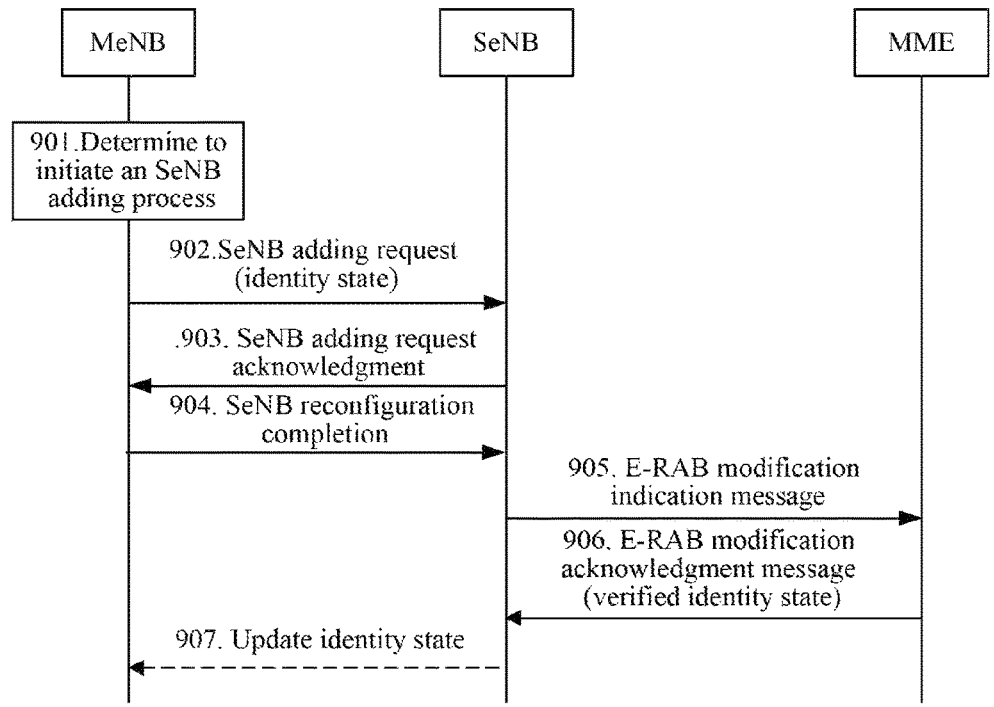
FIG. 9 illustrates a flowchart of embodiment 4 of the present document.

This embodiment describes a method for initiating CSG access control or identity verification by an SeNB after the SeNB is added. FIG. 9 is a flowchart of the method provided by this embodiment. As illustrated in FIG. 9, the method provided by this embodiment includes the following steps:

In step 901, an MeNB determines to initiate an SeNB adding process for a UE based on an RRM measurement report of the UE. In this embodiment, the SeNB is an HeNB, and the RRM measurement report of the UE contains a CSG identity state of the UE in a CSG/hybrid cell of the SeNB, or reports a PLMN ID list indicating that the UE has a member identity in the CSG/hybrid cell of the SeNB. The measurement report of the UE contains PCI/ECGI of the SeNB, the MeNB may know an access mode of the SeNB according to the PCI/ECGI, and the measurement report of the UE further contains CSG ID of a cell under the SeNB. If both the MeNB and the SeNB are hybrid or closed mode HeNBs and CSG IDs of the MeNB and the SeNB are the same, the MeNB directly initiates the SeNB adding process and the UE accesses the SeNB with the same CSG identity state of the UE in the CSG/hybrid cell of the MeNB. If the SeNB is a hybrid mode HeNB (except the situation that the MeNB is also an HeNB and has the same CSG ID as the SeNB), the MeNB determines that the UE can firstly access the SeNB with the default CSG identity state or the CSG identity state reported by the UE, and then a CSG member identity verification result is acquired from an MME.

In step 902, if the MeNB determines that the UE can access the SeNB, the MeNB transmits an SeNB adding request message to the SeNB, herein the SeNB adding request message at least contains a CSG identity state to indicate that the UE accesses the SeNB with an identity of a member or a non-member. The CSG identity state may be a default CSG identity state, or a CSG identity state which is the same as the CSG identity state of the UE in the CSG/hybrid cell of the MeNB, or a CSG identity state reported by the UE, herein the default CSG identity state is a non-member identity.

In step 903, the SeNB determines whether to accept the SeNB adding request, e.g., according to the current load situation. If the SeNB adding request is accepted, a resource reservation is made according to the E-RAB information in the adding request and an SeNB adding request acknowledgment message is transmitted to the MeNB, and the message may contain air interface radio resource configuration information.

In step 904, if air interface configuration information change of the UE is involved, the MeNB transmits an RRC connection reconfiguration message to the UE to instruct the UE to perform air interface reconfiguration. The UE performs cell synchronization and random access with the SeNB and performs air interface reconfiguration, and then an RRC reconfiguration completion message is replied to the MeNB. Then, the MeNB transmits an SeNB reconfiguration completion message to the SeNB to indicate that new radio air interface configuration has been successfully completed.

In step 905, if data forwarding is needed, a corresponding data forwarding process may be performed between the MeNB and the SeNB. The MeNB transmits an E-RAB modification indication message (notes: other newly-added S1 messages may also be adopted) to the MME to request the MME to perform a CSG check, i.e., CSG access control or member identity verification. Herein the message may include the following information: a CSG identifier, an access mode, a CSG identity state, a PLMN ID and base station identifier information of the SeNB. Herein, the CSG identity state is received by the SeNB in the message in step 902, i.e., the CSG identity state may be a default CSG identity state, or a CSG identity state reported by the UE or a CSG identity state which is the same as the CSG identity state of the UE in the MeNB. If the user plane architecture 1A is adopted, the message is used for user plane path update and contains the E-RAB information which is to be transferred to the SeNB.

In step 906, the MME judges whether the UE can access the CSG/hybrid cell of the SeNB or whether the member identity is member or non-member according to the CSG subscription information of the UE acquired from the HSS. Alternatively, the MME further performs the verification of the CSG ID and access mode to verify the validity of the CSG ID and/or access mode of the CSG/hybrid cell of the SeNB. In addition, after the MME receives the E-RAB modification indication message, the CSG ID and the corresponding E-RAB information contained in the message may be used for a purpose of subsequently charging. The MME performs subsequent interaction with the SGW and informs the SGW about S1-U tunnel information of the SeNB. Then, the MME transmits the verified CSG identity state information of the UE to the SeNB through an E-RAB modification acknowledgement message. The CSG identity state information includes a CSG identity state which is a member or a non-member; or access allowance or disallowance indication information; or compliance or incompliance indication information, herein the compliance or incompliance indication information indicates that the CSG identity state of the UE verified by the MME is compliant or incompliant with the identity state in the received request message.

In step 907, if the CSG identity state received by the SeNB from the MME is different from the identity state carried in the message in step 902, the CSG identity state of the UE in the SeNB is updated, and the CSG identity state received from the MME in step 906 is transmitted to the MeNB. Alternatively, the message may further contain updated UE-AMBR for the SeNB. After the MeNB receives the CSG identity state, the CSG identity state of the UE in the SeNB is correspondingly updated.

Embodiment 5

Figure 10:
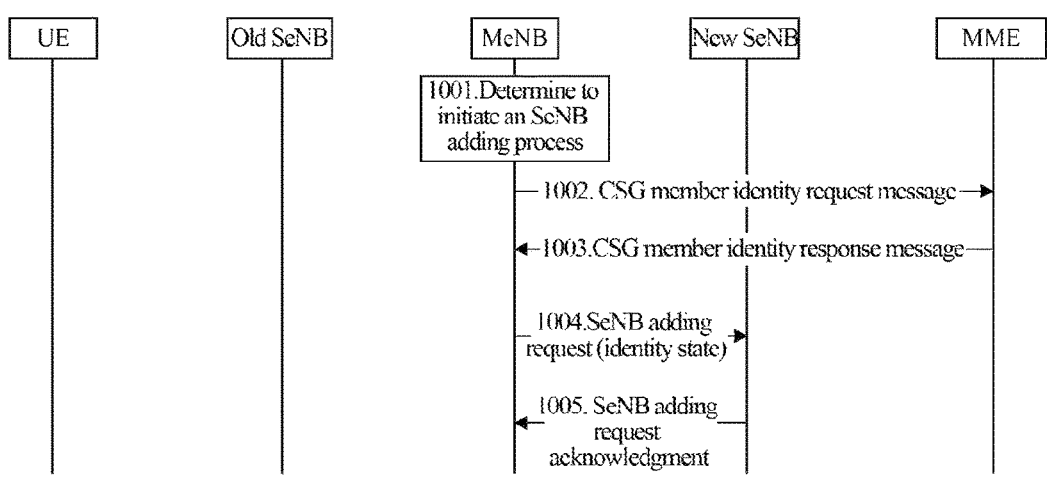
FIG. 10 illustrates a flowchart of embodiment 5 of the present document.

This embodiment describes a method for initiating CSG access control or identity verification by an MeNB under an SeNB change scenario before an SeNB is added. FIG. 10 is a flowchart of the method provided by this embodiment. As illustrated in FIG. 10, the method provided by this embodiment includes the following steps:

In step 1001, UE moves from a coverage range of an old SeNB to a coverage range of a new SeNB, or in consideration of offloading or load balancing, etc., an MeNB determines to initiate an SeNB change process for the UE based on an RRM measurement report of the UE, i.e., deleting the old SeNB and adding the new SeNB. In this embodiment, the new SeNB is an HeNB, and the RRM measurement report of the UE contains a CSG identity state of the UE in a CSG/hybrid cell of the new SeNB, or reports a PLMN ID list indicating that the UE has a member identity in the CSG/hybrid cell of the new SeNB. The measurement report of the UE contains PCI/ECGI of the new SeNB, the MeNB may know an access mode of the new SeNB according to the PCI/ECGI, and the measurement report of the UE further contains CSG ID of a cell under the new SeNB. Deployment of the MeNB, the old SeNB and the new SeNB may be divided into the following several situations:

1) the MeNB/old SeNB is a macro eNB and the new SeNB is a hybrid or closed mode HeNB;

2) the MeNB/old SeNB and the new SeNB are hybrid or closed mode HeNBs, and CSG IDs of the MeNB/old SeNB and the new SeNB are different, and 3) the MeNB/old SeNB and the new SeNB are hybrid or closed mode HeNBs, and CSG IDs of the MeNB/old SeNB and the new SeNB are the same.

Under the situation 1) or 2), the MME needs to perform CSG access control or member identity verification; and under the situation 3), the MeNB directly initiates the SeNB change process and the MME does not need to perform the CSG access control or member identity verification, but the UE accesses the new SeNB with the same CSG identity state of the UE in the CSG/hybrid cell of the MeNB, i.e., subsequent steps 1002 and 1003 are skipped.

In step 1002, if the MME needs to perform the CSG access control or member identity verification, the MeNB needs to acquire the CSG identity state of the UE in the CSG/hybrid cell of the new SeNB from the MME to determine whether the UE can access the new SeNB or whether the UE accesses the new SeNB with an identity of a member or a non-member. The MeNB requests the MME to perform the CSG access control or member identity verification by transmitting an S1 message. The S1 message may be a newly-added S1 interface message such as a CSG member identity request message. The request message may contain a CSG ID, an access mode, a PLMN identifier, a CSG identity state and a base station identifier corresponding to the CSG ID. Herein, the CSG identity state may be a CSG identity state reported by the UE, the CSG ID is a CSG identifier of the CSG/hybrid cell of the new SeNB, and the access mode is the access mode of the new SeNB cell, may be hybrid or closed, or is indicated by the CSG or is a closed mode by default under the situation that the access mode is not included. The base station identifier corresponding to the CSG ID is the eNB ID of the new SeNB. In addition, the request message may contain E-RAB information of the UE which is to be transferred to the new SeNB, such as one or more E-RAB IDs.

In step 1003, the MME judges whether the UE can access the CSG/hybrid cell of the new SeNB or whether the member identity is a member or a non-member according to the CSG subscription information of the UE acquired from the HSS. Alternatively, the MME further performs the verification of the CSG ID and/or access mode to verify the validity of the CSG ID and/or access mode of the CSG/hybrid cell of the new SeNB. If the request message received by the MME contains the E-RAB information, the MME may use the CSG ID and the corresponding E-RAB information for a purpose of subsequently charging. The MME transmits the verified CSG identity state information of the UE to the MeNB through the S1 message (as a CSG member identity response message). The CSG identity state information includes a CSG identity state which is a member or a non-member; or access allowance or disallowance indication information; or compliance or incompliance indication information, herein the compliance or incompliance indication information indicates that the CSG identity state of the UE verified by the MME is compliant or incompliant with the identity state in the received request message.

In step 1004, the MeNB determines whether to add the new SeNB for the UE according to the received CSG identity state information. If the mode of the new SeNB cell is a closed mode and the CSG identity state information indicates that the UE is a member in the CSG cell of the new SeNB or contains access allowance indication information, the new SeNB may be added; and if the CSG identity state information indicates that the UE is a non-member in the CSG cell of the new SeNB or contains access disallowance indication information, the new SeNB is not added. If the mode of the new SeNB cell is a hybrid mode and the CSG identity state information indicates that the UE is a member or a non-member in the hybrid cell of the new SeNB, correspondingly the UE accesses the new SeNB with an identity of a member or a non-member. If the MeNB determines to perform the adding of the SeNB, an SeNB adding request message is transmitted to the new SeNB and the message at least contains the CSG identity state of the UE in the CSG/hybrid cell of the new SeNB.

In step 1005, the SeNB determines whether to accept the SeNB adding request, e.g., according to the current load situation. If the SeNB adding request is accepted, a resource reservation is made according to the E-RAB information in the adding request and an SeNB adding request acknowledgment message is transmitted to the MeNB, and the message may contain air interface radio resource configuration information. After the MeNB receives the message, the MeNB may perform a process of subsequent new SeNB adding and old SeNB deleting.

In addition, if the request message received by the MME in step 1002 does not contain E-RAB information, the MeNB may transmit the CSG ID of the new SeNB and the corresponding E-RAB information of the UE to the MME through the S1 message for a purpose of subsequently charging after the SeNB change is completed, e.g., through an E-RAB modification indication message.

It needs to be noted that the CSG access control or member identity verification may be initiated by the new SeNB instead of the MeNB. The specific flow may refer to the method flow in embodiment 3.

Embodiment 6

Figure 11:
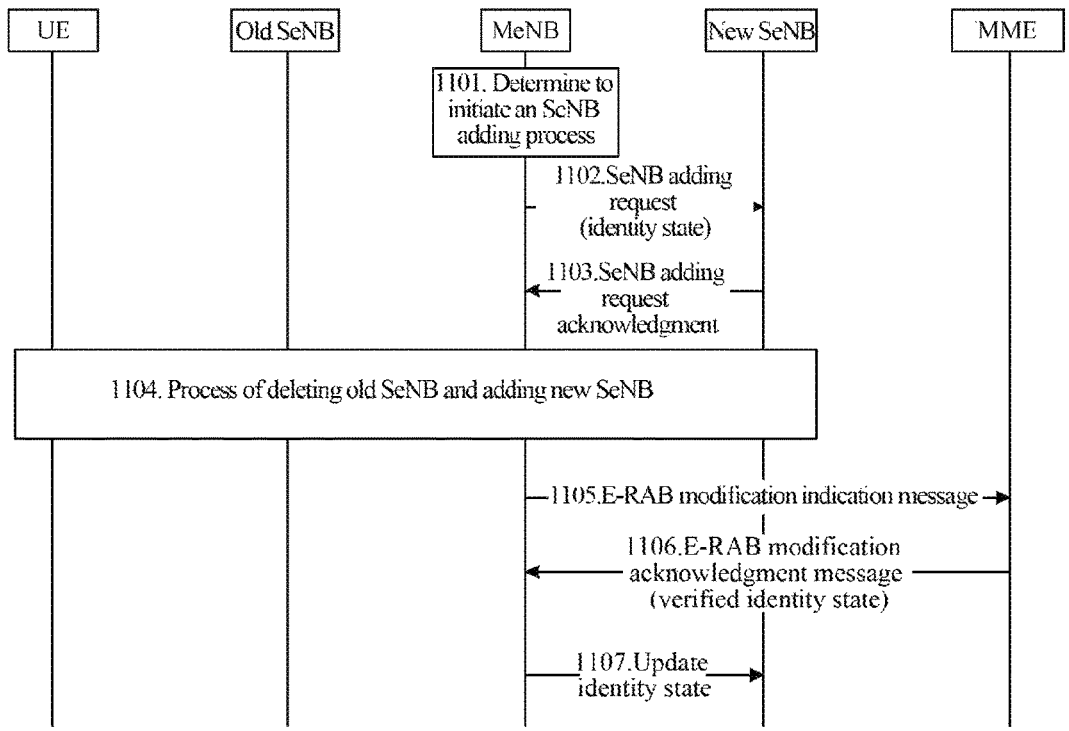
FIG. 11 illustrates a flowchart of embodiment 6 of the present document.

This embodiment describes a method for initiating CSG access control or identity verification by an MeNB after an SeNB is changed. FIG. 11 is a flowchart of the method provided by this embodiment. As illustrated in FIG. 11, the method provided by this embodiment includes the following steps:

In step 1101, UE moves from a coverage range of an old SeNB to a coverage range of a new SeNB, or in consideration of offloading or load balancing, etc., an MeNB determines to initiate an SeNB change process for the UE based on an RRM measurement report of the UE, i.e., deleting the old SeNB and adding the new SeNB. In this embodiment, the SeNB is an HeNB, and the RRM measurement report of the UE contains a CSG identity state of the UE in a CSG/hybrid cell of the new SeNB, or reports a PLMN ID list indicating that the UE has a member identity in the CSG/hybrid cell of the new SeNB. The measurement report of the UE contains PCI/ECGI of the new SeNB, the MeNB may know an access mode of the new SeNB according to the PCI/ECGI, and the measurement report of the UE further contains CSG ID of a cell under the new SeNB. If the MeNB/old SeNB and the new SeNB are hybrid or closed mode HeNBs and CSG IDs of the MeNB/old SeNB and the new SeNB are the same, the MeNB directly initiates the SeNB change process and the UE accesses the new SeNB with the same CSG identity state of the UE in the CSG/hybrid cell of the MeNB/old SeNB. If the new SeNB is a hybrid mode HeNB (except the situation that the MeNB/old SeNB is also an HeNB and has the same CSG ID as the new SeNB), the MeNB determines that the UE can firstly access the new SeNB with the default CSG identity state or the CSG identity state reported by the UE, and then a CSG member identity verification result is acquired from an MME.

In step 1102, if the MeNB determines that the UE can access the new SeNB, the MeNB transmits an SeNB adding request message to the new SeNB, herein the SeNB adding request message at least contains a CSG identity state to indicate that the UE accesses the SeNB with an identity of a member or a non-member. The CSG identity state may be a default CSG identity state, or a CSG identity state which is the same as the CSG identity state of the UE in the CSG/hybrid cell of the MeNB/old SeNB, or a CSG identity state reported by the UE, herein the default CSG identity state is a non-member identity.

In step 1103, the SeNB determines whether to accept the SeNB adding request, e.g., according to the current load situation. If the SeNB adding request is accepted, a resource reservation is made according to the E-RAB information in the adding request and an SeNB adding request acknowledgment message is transmitted to the MeNB, and the message may contain air interface radio resource configuration information.

In step 1104, after the MeNB receives the message, the MeNB performs an old SeNB deleting process and instructs the UE through RRC dedicated signaling to perform radio resource configuration, and perform cell synchronization and random access with the SeNB. After the RRC reconfiguration of the UE is successfully completed, an RRC reconfiguration completion message is transmitted to the MeNB. Then, the MeNB transmits an SeNB reconfiguration completion message to the MeNB.

In step 1105, the MeNB transmits an E-RAB modification indication message to the MME, herein the message includes the E-RAB information which is to be transferred to the new SeNB and the message may further the following information: a CSG identifier, an access mode, a CSG identity state, a PLMN ID and base station identifier information of the SeNB. Herein, the CSG identity state is received by the SeNB in the message in step 1102, i.e., the CSG identity state may be a default CSG identity state, or a CSG identity state reported by the UE or a CSG identity state which is the same as the CSG identity state of the UE in the MeNB/old SeNB.

In step 1106, the MME judges whether the UE can access the CSG/hybrid cell of the new SeNB or whether the member identity is a member or a non-member according to the CSG subscription information of the UE acquired from the HSS. Alternatively, the MME further performs the verification of the CSG ID and access mode to verify the validity of the CSG ID and/or access mode of the CSG/hybrid cell of the new SeNB. In addition, after the MME receives the E-RAB modification indication message, the CSG ID and the corresponding E-RAB information contained in the message may be used for a purpose of subsequently charging. The MME performs subsequent interaction with the SGW and informs the SGW about S1-U tunnel information of the SeNB. Then, the MME transmits the verified CSG identity state information of the UE to the MeNB through an E-RAB modification acknowledgment message. The CSG identity state information includes a CSG identity state which is a member or a non-member; or access allowance or disallowance indication information; or compliance or incompliance indication information, herein the compliance or incompliance indication information indicates that the CSG identity state of the UE verified by the MME is compliant or incompliant with the identity state in the received request message.

In step 1107, if the CSG identity state received by the MeNB from the MME is different from the identity state carried in the message in step 1102, the CSG identity state of the UE in the new SeNB is updated, and the CSG identity state received from the MME in step 1106 is transmitted to the new SeNB. Specifically, the CSG identity state may be transmitted through an SeNB modification request message. Alternatively, the message may further contain updated UE-AMBR for the new SeNB. After the new SeNB receives the CSG identity state, the CSG identity state of the UE in the new SeNB is correspondingly updated.

It needs to be noted that the CSG access control or member identity verification may be initiated by the new SeNB instead of the MeNB. The specific flow may refer to the method flow in embodiment 4.

Figure 12:
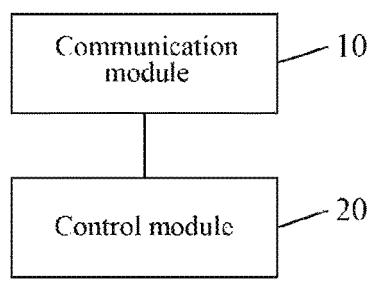
FIG. 12 illustrates a structural schematic diagram of components of a system for controlling access of a CSG in a dual-connection architecture provided by the embodiment of the present document.

Corresponding to the method for controlling access of a CSG in a dual-connection architecture provided by the embodiment of the present document, the embodiment of the present document further provides a system for controlling access of a CSG in a dual-connection architecture, applied to a base station. As illustrated in FIG. 12, the system includes:

a communication module 10 configured to acquire CSG identity state information of UE; and a control module 20 configured to determine a CSG access policy of the UE according to the acquired CSG identity state information of the UE.

Preferably, the communication module 10 is configured to acquire the CSG identity state information of the UE from an MME;

and/or acquire the CSG identity state information from the UE;

and/or self-determine the CSG identity state information of the UE.

Herein, acquiring the CSG identity state information of the UE from the MME includes:

the CSG identity state information of the UE transmitted by the MME is received through an S1 interface message, and herein the S1 interface message is:

an E-RAB modification acknowledgment message;

or a path transfer request acknowledgment message;

or a newly-added S1 message.

Herein, the base station is an MeNB or an SeNB.

Preferably, the control module 20 is configured to:

determine whether the UE can access the SeNB according to the CSG identity state information in the MeNB;

or determine whether the UE accesses the SeNB with an identity of a member or a non-member according to the CSG identity state information in the MeNB;

or determine whether the UE can access the SeNB according to the CSG identity state information in the SeNB;

or determine whether the UE accesses the SeNB with an identity of a member or a non-member according to the CSG identity state information in the SeNB.

Preferably, the communication module 10 is configured to:

after the control module 20 in the MeNB determines that the UE can access the SeNB or the UE accesses the SeNB with an identity of a member or a non-member according to the CSG identity state information, transmit the CSG identity state information to the SeNB by the communication module;

or, after the control module 20 in the SeNB determines that the UE can access the SeNB or the UE accesses the SeNB with an identity of a member or a non-member according to the CSG identity state information, transmit the CSG identity state information to the MeNB by the communication module.

Preferably, the step of determining whether the UE can access the SeNB according to the CSG identity state information in the MeNB or SeNB further includes:

if the control module 20 in the MeNB determines that the UE can access the SeNB, an adding process of the SeNB is initiated;

or if the control module 20 in the MeNB determines that the UE cannot access the SeNB, the adding process of the SeNB is not initiated;

or if the control module 20 in the SeNB determines that the UE cannot access the SeNB, an SeNB adding request transmitted by the MeNB is refused.

Herein, a message for the SeNB refusing the adding request contains a cause value indicating that the SeNB refuses to be added or the CSG identity state information of the UE.

The communication module 10 in the MeNB is further configured to transmit CSG related information to the SeNB in the adding process of the SeNB.

Transmitting the CSG related information to the SeNB in the adding process of the SeNB includes:

the CSG related information to the SeNB is transmitted through an SeNB adding request message of an X2 interface; and herein the CSG related information includes at least one of the following: a CSG identity state, a CSG identifier and an access mode.

Preferably, the communication module 10 is further configured to:

before receiving the CSG identity state information of the UE transmitted by the MME, transmit an S1 message to the MME to request the MME to transmit the CSG identity state information of the UE.

Preferably, the communication module 10 in the MeNB requests the MME to transmit the CSG identity state information of the UE before the SeNB is added;

or the communication module 10 in the MeNB requests the MME to transmit the CSG identity state information of the UE after the SeNB is added;

or the communication module 10 in the SeNB requests the MME to transmit the CSG identity state information of the UE after receiving the SeNB adding request transmitted by the MeNB;

or the communication module 10 in the SeNB requests the MME to transmit the CSG identity state information of the UE after the SeNB is added.

The S1 message is:

an E-RAB modification indication message;

or a path transfer request message;

or a newly-added S1 message.

The S1 message includes at least one of the following:

a CSG identifier, an access mode, a PLMN identifier, a CSG identity state, an identifier of a base station corresponding to the CSG identifier, E-RAB information and MeNB or SeNB indication information.

The PLMN identifier is a current serving PLMN identifier of the UE or a PLMN identifier selected by the UE under the SeNB.

The MeNB or SeNB indication information indicates that the base station corresponding to the CSG identifier is an MeNB or an SeNB.

Preferably, the communication module 10 is further configured to transmit the CSG identifier and associated information of a bearer of the UE to the MME, and herein the CSG identifier and the associated information of the bearer of the UE include a CSG identifier and corresponding bearer information of the UE accessing through a cell where the CSG is located.

The CSG identity state information includes:

a CSG identity state, herein the CSG identity state is a member or a non-member;

and/or access allowance or disallowance indication information;

and/or compliance or incompliance indication information, herein the compliance or incompliance indication information indicates that the CSG identity state of the UE verified by the MME is compliant or incompliant with the CSG identity state received by the MME from the request message transmitted by the base station;

and/or a corresponding CSG identifier.

The CSG identity state is a default CSG identity state, or a CSG identity state reported by the UE through an air interface, or a CSG identity state which is the same as the CSG identity state of the UE accessing the MeNB, or a CSG identity state transmitted by the MME and received by the base station.

Preferably, the MeNB and/or the SeNB may be an HeNB.

It needs to be stated that the communication module 10 may be implemented through a communication function chip of the base station and the control module 20 may be implemented through a Central Processing Unit (CPU), a Micro Processing Unit (MPU), a Digital Signal Processor (DSP) or a Field-Programmable Gate Array (FPGA) of the base station.

The embodiment of the present document further provides a computer-readable storage medium, and the storage medium includes a group of computer-executable instructions which are used for implementing the method for controlling access of a CSG in a dual-connection architecture provided by the embodiment of the present document.

In the embodiments provided by the present document, it should be understood that the disclosed methods, apparatus and electronic devices may be implemented in other ways. The device embodiments described above are just exemplary. For example, the division of the units is just a division based on logical functions and other division ways may be adopted during actual implementation, e.g., a plurality of units or components may be combined or may be integrated in another system, or some features may be neglected or not performed. In addition, the coupling, direct coupling or communication connection between the illustrated or discussed components may be indirect coupling or communication connection through some interfaces, devices or units, and may be electrical, mechanical or in other forms.

Units which are described above as discrete parts may be or may also not be physically separated; parts illustrated as units may be or may also not be physical units, and not only can be located at the same position, but also can be distributed on a plurality of network units; and partial or all units may be selected according to the actual needs to realize the purpose of the solution of the embodiment.

In addition, all function units in the embodiments of the present document may be fully integrated in one processing unit and may also be respectively used as separate units, and two or more units may also be integrated in one unit; and the integrated units may be implemented by means of hardware and may also be implemented by means of hardware and software function units.

One skilled in the art can understand that all or partial steps for implementing the above-mentioned method embodiments can be completed by relevant hardware instructed by a program, and the program can be stored in a computer-readable storage medium, and when the program is performed, the steps in the above-mentioned method embodiments are performed; and the foresaid storage medium includes various mediums capable of storing program codes, such as a mobile storage device, a Read-Only Memory (ROM), a Random Access Memory (RAM), a magnetic disk or a compact disk.

Or, in the embodiments of the present document, if the integrated units are implemented by means of software function modules and are sold or used as independent products, the units may also be stored in a computer-readable storage medium. Based on such understanding, the technical solution of the embodiments of the present document substantially or the portion which makes a contribution to the prior art may be reflected by means of software product, the computer software product is stored in a storage medium and includes a plurality of instructions which enable a computer device (which may be a personal computer, a server or a network device) to execute all or partial steps of the method provided by each embodiment of the present document. The foresaid storage medium includes various mediums capable of storing program codes, such as a mobile storage device, a Read-Only Memory (ROM), a Random Access Memory (RAM), a magnetic disk or a compact disk.

The above-mentioned embodiments are just preferred embodiments but the protection scope of the present document is not limited thereto. One skilled in the art may easily conceive variation or replacement within the technical scope disclosed by the present document, but such variation or replacement is included in the protection scope of the present document. Therefore, the protection scope of the present document shall be subjected to the protection scope of the claims.

INDUSTRIAL APPLICABILITY

By implementing the embodiments of the present document, under a situation that an HeNB is used for the dual-connection architecture, CSG access control or member identity verification functions can be guaranteed to be correctly implemented, such that the UE in the dual-connection architecture can access the HeNB with a correct CSG identity.

What is claimed is:

1. A method for controlling access of a Closed Subscriber Group (CSG) in a dual-connection architecture, comprising:
    a base station acquiring CSG state information of a User Equipment (UE); and
    the base station determining a CSG access policy of the UE according to the acquired CSG state information of the UE;
    wherein the method further comprises:
    transmitting, by a Master eNB (MeNB), CSG related information to a Secondary eNB (SeNB) in an adding process of the SeNB, and the CSG related information comprises a CSG membership status.

2. The method for controlling access of a CSG in a dual-connection architecture according to claim 1, wherein the base station acquiring CSG state information of a UE comprises:
    the base station acquiring the CSG state information of the UE from a Mobile Management Entity (MME);
    and/or the base station acquiring the CSG state information from the UE;
    and/or the base station self-determining the CSG state information of the UE.

3. The method for controlling access of a CSG in a dual-connection architecture according to claim 2, wherein the base station acquiring the CSG state information of the UE from an MME comprises:
    the base station receiving the CSG state information of the UE transmitted by the MME through an S1 interface message, and wherein the S1 interface message is:
    an Evolved-Universal Terrestrial Radio Access Network (E-UTRAN) Radio Access Bearer (E-RAB) modification acknowledgment message;
    or a path transfer request acknowledgment message;
    or a newly-added S1 message.

4. The method for controlling access of a CSG in a dual-connection architecture according to claim 2, wherein, before the base station acquires the CSG state information of the UE from the MME, the method further comprises:
  the base station transmitting an S1 message to the MME to request the MME to transmit the CSG state information of the UE,
  wherein the method further comprises:
  the MeNB requesting the MME to transmit the CSG state information of the UE before the SeNB is added;
  or the MeNB requesting the MME to transmit the CSG state information of the UE after the SeNB is added;
  or the SeNB requesting the MME to transmit the CSG state information of the UE after receiving the SeNB adding request transmitted by the MeNB;
  or the SeNB requesting the MME to transmit the CSG state information of the UE after the SeNB is added.

5. The method for controlling access of a CSG in a dual-connection architecture according to claim 4, wherein the Si message is:
  an Evolved-Universal Terrestrial Radio Access Network (E-UTRAN) Radio Access Bearer (E-RAB) modification indication message;
  or a path transfer request message;
  or a newly-added S1 message.

6. The method for controlling access of a CSG in a dual-connection architecture according to claim 4, wherein the S1 message comprises at least one of the following:
  a CSG identifier, an access mode, a Public Land Mobile Network (PLMN) identifier, a CSG identity state, an identifier of a base station corresponding to the CSG identifier, E-RAB information, and MeNB or SeNB indication information,
  wherein the PLMN identifier is a current serving PLMN identifier of the UE or a PLMN identifier selected by the UE under the SeNB,
  wherein the MeNB or SeNB indication information indicates that the base station corresponding to the CSG identifier is an MeNB or an SeNB.

7. The method for controlling access of a CSG in a dual-connection architecture according to claim 6, wherein the method further comprises:
  the base station transmitting the CSG identifier and associated information of a bearer of the UE to the MME, wherein the CSG identifier and the associated information of the bearer of the UE comprise a CSG identifier and corresponding bearer information of the UE accessing through a cell where the CSG is located.

8. The method for controlling access of a CSG in a dual-connection architecture according to claim 4, wherein, before the base station acquires the CSG state information of the UE, the method further comprises:
  the MME determining the CSG state information of the UE according to CSG subscription information of the UE;
  and/or the MME verifying validity of the CSG identifier and/or the access mode in the S1 message.

9. The method for controlling access of a CSG in a dual-connection architecture according to claim 2, wherein the CSG state information comprises:
  a CSG identity state, wherein the CSG identity state is a member or a non-member;
  and/or access allowance or disallowance indication information;
  and/or compliance or incompliance indication information, wherein the compliance or incompliance indication information indicates that the CSG identity state of the UE verified by the MME is compliant or incompliant with the CSG identity state received by the MME in the request message transmitted by the base station; and/or a CSG identifier,
  wherein the CSG identity state is a default CSG identity state, or a CSG identity state reported by the UE through an air interface, or a CSG identity state which is the same as the CSG identity state of the UE accessing the MeNB, or a CSG identity state transmitted by the MME and received by the base station.

10. The method for controlling access of a CSG in a dual-connection architecture according to claim 2, wherein the MeNB and/or the SeNB is a Home eNB (HeNB).

11. The method for controlling access of a CSG in a dual-connection architecture according to claim 1, wherein the base station is the MeNB or the SeNB.

12. The method for controlling access of a CSG in a dual-connection architecture according to claim 11, wherein the base station determining a CSG access policy of the UE according to the acquired CSG state information of the UE comprises:
  the MeNB determining whether the UE can access the SeNB according to the CSG state information;
  or the MeNB determining whether the UE accesses the SeNB with an identity of a member or a non-member according to the CSG state information;
  or the SeNB determining whether the UE can access the SeNB according to the CSG state information;
  or the SeNB determining whether the UE accesses the SeNB with an identity of a member or a non-member according to the CSG state information.

13. The method for controlling access of a CSG in a dual-connection architecture according to claim 12, wherein,
  after the MeNB determines that the UE can access the SeNB or the UE accesses the SeNB with an identity of a member or a non-member according to the CSG state information, the method further comprises: the MeNB transmitting the CSG state information to the SeNB;
  or,
  after the SeNB determines that the UE can access the SeNB or the UE accesses the SeNB with an identity of a member or a non-member according to the CSG state information, the method further comprises:
  the SeNB transmitting the CSG state information to the MeNB.

14. The method for controlling access of a CSG in a dual-connection architecture according to claim 12, wherein the MeNB or SeNB determining whether the UE can access the SeNB according to the CSG state information further comprises:
  if determining that the UE can access the SeNB, the MeNB initiating an adding process of the SeNB;
  or if determining that the UE cannot access the SeNB, the MeNB not initiating the adding process of the SeNB;
  or if determining that the UE cannot access the SeNB, the SeNB refusing an SeNB adding request transmitted by the MeNB.

15. The method for controlling access of a CSG in a dual-connection architecture according to claim 14, wherein a message for the SeNB refusing the adding request contains a cause value indicating that the SeNB refuses to be added or the CSG state information of the UE.

16. The method for controlling access of a CSG in a dual-connection architecture according to claim 14,
  wherein the MeNB transmitting CSG related information to the SeNB in the adding process of the SeNB comprises:

the MeNB transmitting the CSG related information to the SeNB through an SeNB adding request message of an X2 interface.

17. A non-transitory computer-readable storage medium, comprising a group of computer-executable instructions which are used for implementing the method for controlling access of a CSG in a dual-connection architecture according to claim 1.

18. A system for controlling access of a Closed Subscriber Group (CSG) in a dual-connection architecture, wherein the system is applied to a base station, and the system comprises:
   a communication module configured to acquire CSG state information of a User Equipment (UE); and
   a control module configured to determine a CSG access policy of the UE according to the acquired CSG state information of the UE;
   wherein CSG related information is transmitted from a Master eNB (MeNB) to a Secondary eNB (SeNB) in an adding process of the SeNB, wherein the CSG related information comprises a CSG membership status.

19. The system for controlling access of a CSG in a dual-connection architecture according to claim 18, wherein the communication module is further configured to:
   acquire the CSG state information of the UE from a Mobile Management Entity (MME);
   and/or acquire the CSG state information from the UE;
   and/or self-determine the CSG state information of the UE.

20. The system for controlling access of a CSG in a dual-connection architecture according to claim 19, wherein acquiring the CSG state information of the UE from the MME comprises:
   receiving the CSG state information of the UE transmitted by the MME through an S1 interface message, and wherein the S1 interface message is:
   an Evolved-Universal Terrestrial Radio Access Network (E-UTRAN) Radio Access Bearer (E-RAB) modification acknowledgment message;
   or a path transfer request acknowledgment message;
   or a newly-added S1 message.

21. The system for controlling access of a CSG in a dual-connection architecture according to claim 20, wherein the base station is the MeNB or the SeNB.

22. The system for controlling access of a CSG in a dual-connection architecture according to claim 21, wherein the control module is further configured to:
   determine whether the UE can access the SeNB according to the CSG state information in the MeNB;
   or determine whether the UE accesses the SeNB with an identity of a member or a non-member according to the CSG state information in the MeNB;
   or determine whether the UE can access the SeNB according to the CSG state information in the SeNB;
   or determine whether the UE accesses the SeNB with an identity of a member or a non-member according to the CSG state information in the SeNB.

23. The system for controlling access of a CSG in a dual-connection architecture according to claim 22, wherein the communication module is further configured to:
   after the control module in the MeNB determines that the UE can access the SeNB or the UE accesses the SeNB with an identity of a member or a non-member according to the CSG state information, transmit the CSG state information to the SeNB;
   or, after the control module in the SeNB determines that the UE can access the SeNB or the UE accesses the SeNB with an identity of a member or a non-member according to the CSG state information, transmit the CSG state information to the MeNB.

24. The system for controlling access of a CSG in a dual-connection architecture according to claim 22, wherein determining whether the UE can access the SeNB according to the CSG state information in the MeNB or SeNB further comprises:
   if determining that the UE can access the SeNB, the control module in the MeNB initiating an adding process of the SeNB;
   or if determining that the UE cannot access the SeNB, the control module in the MeNB not initiating the adding process of the SeNB;
   or if determining that the UE cannot access the SeNB, the control module in the SeNB refusing an SeNB adding request transmitted by the MeNB.

25. The system for controlling access of a CSG in a dual-connection architecture according to claim 24, wherein a message for the SeNB refusing the adding request contains a cause value indicating that the SeNB refuses to be added or the CSG state information of the UE.

26. The system for controlling access of a CSG in a dual-connection architecture according to claim 24, wherein the communication module in the MeNB is further configured to:
   transmit the CSG related information to the SeNB through an SeNB adding request message of an X2 interface.

27. The system for controlling access of a CSG in a dual-connection architecture according to claim 19, wherein the communication module is further configured to, before receiving the CSG state information of the UE transmitted by the MME, transmit an Si message to the MME to request the MME to transmit the CSG state information of the UE, wherein:
   the communication module in the MeNB requests the MME to transmit the CSG state information of the UE before the SeNB is added;
   or the communication module in the MeNB requests the MME to transmit the CSG state information of the UE after the SeNB is added;
   or the communication module in the SeNB requests the MME to transmit the state information of the UE after receiving the SeNB adding request transmitted by the MeNB;
   or the communication module in the SeNB requests the MME to transmit the CSG state information of the UE after the SeNB is added.

28. The system for controlling access of a CSG in a dual-connection architecture according to claim 27, wherein the S1 message is:
   an Evolved-Universal Terrestrial Radio Access Network (E-UTRAN) Radio Access Bearer (E-RAB) modification indication message;
   or a path transfer request message;
   or a newly-added S1 message.

29. The system for controlling access of a CSG in a dual-connection architecture according to claim 27, wherein the Si message comprises at least one of the following:
   a CSG identifier, an access mode, a Public Land Mobile Network (PLMN) identifier, a CSG identity state, an identifier of a base station corresponding to the CSG identifier, E-RAB information, and MeNB or SeNB indication information,
   wherein the PLMN identifier is a current serving PLMN identifier of the UE or a PLMN identifier selected by the UE under the SeNB, wherein the MeNB or SeNB indication information indicates that the base station corresponding to the CSG identifier is an MeNB or an SeNB.

30. The system for controlling access of a CSG in a dual-connection architecture according to claim 29, wherein the communication module is further configured to transmit the CSG identifier and associated information of a bearer of the UE to the MME, and wherein the CSG identifier and the associated information of the bearer of the UE comprise a CSG identifier and corresponding bearer information of the UE accessing through a cell where the CSG is located.

31. The system for controlling access of a CSG in a dual-connection architecture according to claim 19, wherein the CSG state information comprises:
 a CSG identity state, wherein the CSG identity state is a member or a non-member;
 and/or access allowance or disallowance indication information;
 and/or compliance or incompliance indication information, wherein the compliance or incompliance indication information indicates that the CSG identity state of the UE verified by the MME is compliant or incompliant with the CSG identity state received by the MME in the request message transmitted by the base station;
 and/or a corresponding CSG identifier,
 wherein the CSG identity state is a default CSG identity state, or a CSG identity state reported by the UE through an air interface, or a CSG identity state which is the same as the CSG identity state of the UE accessing the MeNB, or a CSG identity state transmitted by the MME and received by the base station.

32. The system for controlling access of a CSG in a dual-connection architecture according to claim 19, wherein the MeNB and/or the SeNB is a Home eNB (HeNB).

* * * * *